3,410,819
ADDITION OF INSOLUBLE ADDITIVES TO FIBERS
DURING MANUFACTURE
Raymond Erdly Kourtz and Ping Liang Ku, Pensacola, Fla., assignors to American Cyanamid Company, Stamford, Conn., a corporation of Maine
No Drawing. Filed June 28, 1963, Ser. No. 291,280
8 Claims. (Cl. 260—29.6)

This invention relates to a method for incorporating additives into a viscous coagulatable polymer solution prior to coagulation thereof as a uniform dispersion of colloidal particles. More particularly, this invention relates to such method wherein the additives are insoluble in the polymer solution but are desirably uniformly dispersed as colloidal particles in the products made by coagulating such polymer solution. Still more particularly, this invention relates to a method for producing artificial filaments and films and the like having uniformly dispersed therein colloidal particles of additives.

In the preparation of artificial filaments and films and the like by the coagulation of viscous polymer solutions, it has long been the practice to admix with such viscous solutions or spin dopes additives to modify various characteristics of the final product. In many instances, such additives were insoluble in the spin dope. Illustrative of such additives are titanium dioxide and other delusterants, pigments, optical brighteners, ultraviolet absorbers, resins, etc.

One of the usual techniques for adding such solid additives to a highly viscous polymer solution is to subdivide such solid material in a colloid mill or the like and to mix it into the viscous solution with agitators, kneaders, mullers, and the like. Unfortunately, with highly viscous solutions, such as are commonly utilized in the spinning of synthetic fibers and films, there is extreme difficulty in obtaining a uniform admixture of these colloidal particles into the viscous solution and there is a strong tendency for such colloidal particles to agglomerate with extended mixing time.

Another technique is to mix up a concentrated batch of such colloidal material in a relatively small amount of a viscous solution of the same kind as is used in the formation of the fibers or films. This concentrated suspension of these colloidal particles is then mixed with a much larger volume of the regular viscous solution or spin dope prior to coagulation thereof. While this technique is some improvement over the first technique it still suffers some of the same drawbacks as previously mentioned.

It is an object of this invention to provide a method for preparing a uniform dispersion of colloidal particles of a solid material suspended in a viscous polymer solution. It is a further object of this invention to provide such a method which is easy to perform and which does not adversely affect the properties of the viscous solution to be coagulated or the products produced therefrom.

It is yet another object of this invention to provide a method for producing a uniform dispersion of colloidal particles in a coagulated product or coagulum made from a viscous coagulatable polymer solution, which product will have the colloidal particles uniformly dispersed therein and substantially free of agglomerates.

Additional objects and advantages will appear hereinafter as the description of this invention proceeds.

Briefly, the process of this invention comprises dissolving the solid additive in a solvent which is miscible with the viscous solution to be coagulated, adding the thus produced solution of additive in solvent to and mixing it with the viscous polymer solution to be coagulated causing the additive to precipitate into the viscous solution as a uniform, fine dispersion of colloidal particles. Upon coagulation of the viscous solution having the additive uniformly, finely dispersed therein in the foregoing manner, the coagulum is found to have uniformly dispersed therein colloidal particles of the additive substantially free of agglomerates.

Shaped articles, such as filaments, fibers, ribbons, tapes, films, etc. may be made from many polymeric materials by processes which involve the coagulation of a viscous coagulatable solution of such polymer in a suitable solvent by means of a suitable coagulation medium. Among these processes may be mentioned "wet spinning" wherein the polymer solution is extruded into a liquid coagulating medium in which the solvent for the polymer is soluble but wherein the polymer is insoluble and "dry spinning" wherein the polymer solution in a volatile solvent is extruded into a gaseous coagulating medium into which the solvent can evaporate.

Many currently known polymeric materials are known to be formable into shaped articles by such processes. Among such materials may be mentioned polyamides, e.g., nylon; polyesters, e.g., poly(ethylene glycol terephthalate); vinyl polymers, e.g., polyvinyl chloride, polyvinyl alcohol; and acrylic polymers, e.g., polyacrylonitrile as well as copolymers of acrylonitrile and one or more other vinyl monomers. Suitable solvents for these materials are well known for use in "wet spinning" and/or "dry spinning" processes. This invention, while useful for the incorporation of insoluble additives into shaped articles of such materials, was particularly developed in connection with the wet spinning of shaped articles in the form of filaments of acrylonitrile polymers utilizing a concentrated aqueous solution of an inorganic salt as the solvent for the polymer. To simplify the further explanation, this invention will be described in terms of the wet spinning of filaments of acrylonitrile polymers with the understanding that this invention is not limited to such specific system.

Many spinning solutions containing acrylonitrile polymerization products dissolved in suitable solvents are known and useful for this invention. Typical of such polymers and solvents are those disclosed in Cummings, United States Patent No. 2,948,581, dated Aug. 9, 1960, and the various other United States patents mentioned therein.

Representative compounds which may be polymerized with acrylonitrile to form acrylonitrile polymerization products useful for the practice of this invention are compounds containing a single $CH_2=C<$ grouping, for instance, the vinyl esters and especially the vinyl esters of saturated aliphatic monocarboxylic acids, e.g., vinyl acetate, vinyl propionate, vinyl butyrate, etc., vinyl and vinylidene halides, e.g., the vinyl and vinylidene chlorides, bromides and fluorides; allyl-type alcohols, e.g., allyl alcohol, methallyl alcohol, ethallyl alcohol, etc.; allyl, methallyl and other unsaturated monohydric alcohol esters of monobasic acids, e.g., allyl and methallyl acetates, laurates, cyanides, etc.; acrylic and alkacrylic acids (e.g., methacrylic, ethacrylic, etc.) and esters and amides of such acids (e.g., methyl, ethyl, propyl, butyl, etc., acrylates and methacrylates, acrylamide, methacrylamide, N-methylethyl- propyl- butyl-, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e.g., isobutylene, etc.; and numerous other vinyl, acrylic and other compounds containing a single $CH_2=C<$ grouping which are copolymerizable with acrylonitrile to yield thermoplastic copolymers. Alkyl esters of alpha, beta-unsaturated polycarboxylic acids may also be copolymerized with acrylonitrile to form copolymers, e.g., the dimethyl, -ethyl, -propyl, -butyl, etc., esters of maleic, fumaric, citraconic, etc., acids.

Ordinarily, the molecular weight (average molecular weight) of the homopolymeric or copolymeric acrylonitrile, from which the polyacrylonitrile shaped articles are made, is within the range of 25,000 or 30,000 to 200,000 or 300,000 or higher, and advantageously is of the order of 50,000 to 100,000, e.g., about 70,000 to 80,000, as calculated from a viscosity measurement of the said polymerization product in dimethyl formamide using the Staudinger equation (reference: Houtz, U.S. Patent No. 2,404,713, dated July 23, 1946).

While it is preferred to have the polymer molecule contain at least about 80% combined acrylonitrile, it is to be understood that polymers containing less than this amount of acrylonitrile may also be useful for the practice of this invention.

Representative solvents into such acrylonitrile polymers may be dissolved are organic solvents such as dimethyl formamide, dimethyl acetamide, ethylene carbonate, and dimethyl sulfoxide and inorganic solvents such as concentrated aqueous solutions of inorganic salts, e.g., sodium thiocyanate, zinc chloride.

Specifically, the process of this invention has been performed utilizing a polymer comprising at least about 80% combined acrylonitrile, copolymerized with one or more of the following: methyl acrylate, vinyl acetate, methyl methacrylate, methyl vinyl pyridine. The polymer was dissolved in a concentrated aqueous solution of sodium thiocyanate and was spun into coagulating bath comprising a cold dilute aqueous solution of sodium thiocyanate to form endless filaments. These filaments were then further treated to produce useful products by known techniques.

In the performance of this invention to incorporate additives into the viscous polymer solution prior to coagulation thereof, it is necessary that a solvent be selected into which the additive may be dissolved and which solvent is miscible with the viscous polymer solution. It is important that this solvent for the additive be inert which means that it does not react with the additives, the solvent for the polymer, or the polymer, or tend to coagulate the viscous coagulatable polymer solution.

For example, when utilizing as the viscous coagulatable polymer solution, a solution of an acrylonitrile polymerization product dissolved in a concentrated aqueous solution of a water-soluble metal salt which yields highly hydrated ions in aqueous solution (such as sodium thiocyanate, lithium thiocyanate, zinc chloride, calcium chloride), suitable solvents are to be found among the water-miscible organic solvents having up to about four carbon atoms in the molecules thereof, such as methyl alcohol, ethyl alcohol, isopropyl alcohol, acetone, ethylmethyl ketone, diethyl ketone, formic acid, acetic acid, propionic acid, ethylene carbonate, dioxane, dimethylformamide, dimethylacetamide, diethylamine, and trimethylamine, and mixtures thereof. The selection of the particular solvent to be used will depend upon the additive it is desired to incorporate into the coagulum since the solvent must be one in which the additive is soluble.

There are numerous purposes for which an additive may be incorporated in a coagulum in a finely dispersed state. These additives may be delusterants, antioxidants, pigments, optical brighteners, ultra-violet absorbers, dye-enhancing modifiers, etc. Many of these materials are currently being added to polymeric materials with difficulty due to inability to produce uniform dispersions of colloidal particles in the viscous coagulatable polymer solutions. Many others are not currently being utilized because of the current impossibility of obtaining a satisfactory uniform dispersion. Among these present and potential additives which may be utilized by the practice of the present invention may be mentioned the following:

(1) Calcofluor® White LVZ optical brightener obtainable from American Cyanamid Company, having the structure

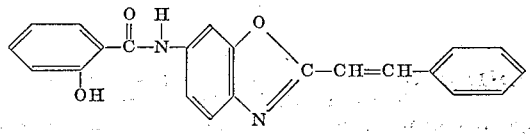

wherein R is —CH$_3$ (2) Brightener F-380, an optical brightener having the structure of Formula I wherein R is

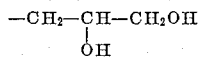

(3) Brightener F-390, an optical brightener having the structure of Formula I wherein R is —CH$_2$CH$_2$OSO$_3$H.

(4) Uvitex K® optical brightener obtainable from Ciba Chemical & Dye Company, whose structure is from the general class described in U.S. Patent No. 2,483,392 dated October 4, 1949, and is believed to be

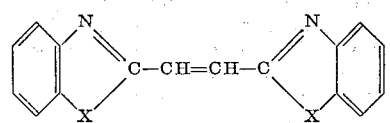

wherein both X's are identical and are selected from the group consisting of O and S.

(5) Tinopal® SFG optical brightener obtainable from Geigy Industrial Chemicals, believed to be of the benzoxazole type which is soluble (>1 gm. per 100 milliliters) in acetone, dimethylformamide, N-N, dimethyl propionamide, and n-butylamine and slightly soluble (about 1 gram per liter) in acetic acid and formic acid.

(6) Tinopal® ACA optical brightener obtainable from Geigy Industrial Chemicals as a solution of 10% Tinopal® ACA, 45% dimethylformamide, and 45% Triton® X-100.

(7) Daitophor® #1013 optical brightener obtainable from Daito Company, Incorporated, Japan, which is soluble in glacial acetic acid to the extent of 1 gram per 8.5 milliliters.

(8) Salts of phosphotungstomolybdic acid, phosphotungstic acid, or phosphomolybdic acid with such dyes as rhodamine B, methyl violet, ethyl violet, Victoria pure blue BO, malachite green, homofuchsine, parafuchsine, new fuchsine, methylene blue, thioflavine, and auramine. These pigments are soluble in dimethylformamide.

(9) Benzophenones, such as

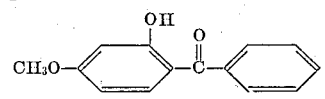

III

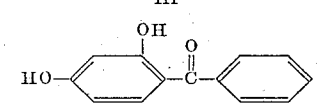

IV

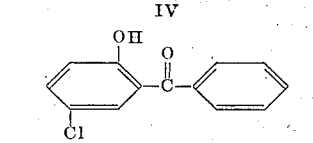

V

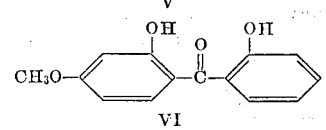

VI

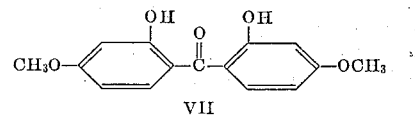

VII

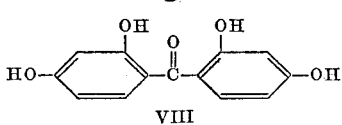

(10) Antioxidant 2246® antioxidant obtainable from American Cyanamid Company, having the structure

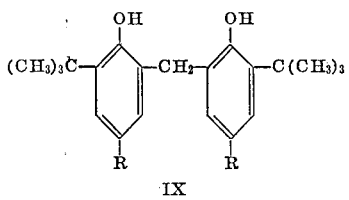

wherein both R's are identical and are —CH₃. This compound is very soluble (>50 grams per 100 milliliters) in acetone, dioxane, ethanol, ethyl acetate, and dimethylformamide and is soluble (>10 grams per 100 milliliters) in glacial acetic acid while being insoluble (<1 part per million) in water, all at 30° C.

(11) Antioxidant 425® antioxidant obtainable from American Cyanamid Company, having the structure of Formula IX wherein both R's are identical and are —C₂H₅. This compound is soluble in most organic solvents, such as acids, ketones, lower alkyl alcohols, dimethylformamide, ethylene carbonate, etc.

(12) Tenox® BHA antioxidant obtainable from Eastman Kodak Company which is a mixture of the two isomers having the structures

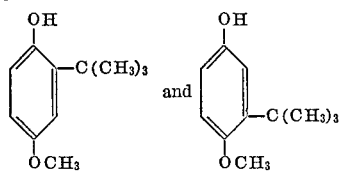

This mixture is very soluble (>20% solution) in acetone, lower alkyl alcohols, and propylene glycol but is insoluble in water.

(13) Tenox® BHT antioxidant obtainable from Eastman Kodak Company, having the structure

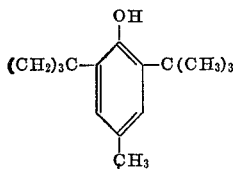

This compound has solubilities comparable to Formula X.

(14) "Ethyl" Antioxidant 702 antioxidant obtainable from Ethyl Corporation, having the structure

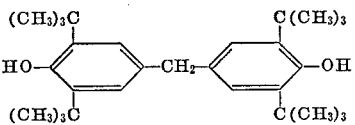

(15) "Ethyl" Antioxidant 703 antioxidant obtainable from Ethyl Corporation, having the structure

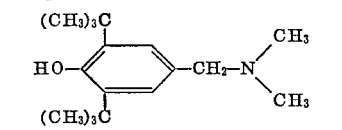

(16) "Ethyl" Antioxidant 736 antioxidant obtainable from Ethyl Corporation, having the structure

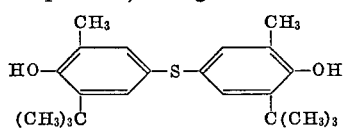

(17) Suconox® antioxidants obtainable from Miles Chemical Company, having the structure

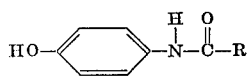

wherein R represents various straight chain aliphatic groups. These compounds are soluble in alcohols, ketones, and dimethylformamide.

(18) "BDPC" antioxidant obtainable from Koppers Company, Inc., having the structure

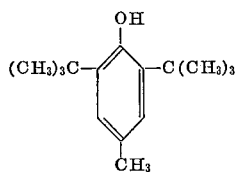

This compound is soluble in lower aliphatic alcohols and ketones.

(19) Dalpac 4 antioxidant obtainable from Hercules Powder Company which is di-tert-butyl-para-cresol and is soluble in alcohols and ketones, but insoluble in water.

In order to produce the fine uniform dispersion of colloidal particles of the additive in the coagulum, the solution of the additive in its solvent should be admixed with the viscous coagulatable polymer solution immediately prior to extrusion and coagulation of the viscous polymer solution so as to minimize the time available for the colloidal particles to agglomerate. This can be accomplished quite effectively by injecting the relatively small amounts of the additive solution directly into the conduit through which the viscous coagulatable polymer solution flows toward the extrusion orifices.

In order to further insure uniform rapid admixture of the solutions to provide a uniform dispersion of colloidal particles, it is frequently desirable to add a wetting agent to the additive solution. Among such wetting agents may be mentioned nonionic agents, which are preferred, as well as anionic and cationic types. Among the wetting agents which may be utilized for such purpose, when desired, may be mentioned the following:

(1) Larosol® 2–14 surface active agent obtainable from Jordan Chemical Co., which is a water-soluble material dissolved in an inert hydrocarbon medium and which is formed from the reaction of tridecyl alcohol with ethylene oxide

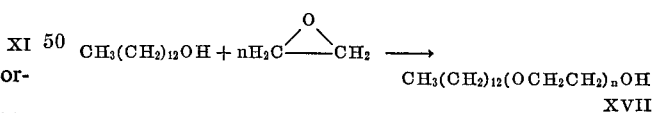

(2) Triton® X-100 surface active agent obtainable from Rohm & Haas Co., having the structure

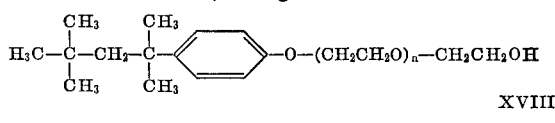

(3) Tergitol® NPX surface active agent obtainable from Union Carbide Chemicals Co., which is a nonyl phenyl polyethylene glycol ether containing 10.5 moles of ethylene oxide.

(4) Naccanol NR, NRCL liquid surface active agent obtainable from Allied Chemical & Dye Co., which is a sodium alkyl aryl sulfonate.

(5) Deceresol® NI surface active agent obtainable from American Cyanamid Company which is an alkyl aryl polyether alcohol.

(6) Deceresol® OT surface active agent obtainable from American Cyanamid Company which is dioctyl sodium sulfosuccinate.

(7) Deceresol® SE surface active agent obtainable from American Cyanamid Company which is stearamidopropyl β-hydroxyethyl dimethyl ammonium chloride.

It is frequently considered desirable to pass the viscous coagulatable polymer solution containing the colloidal particles of additive thus prepared through a filter prior to extrusion thereof when spinning filamentary material through extremely fine orifices in order to avoid the possibility of any such orifices becoming blocked as well as to increase the homogeneity of the dispersion of colloidal particles in the polymer solution.

While the foregoing description of this invention has been primarily directed toward incorporating additives into a viscous coagulatable polymer solution of an acrylonitrile polymerization product dissolved in a concentrated aqueous solution of a water-soluble metal salt, it will be readily recognized that this invention is not limited thereto since it is directed to a physical phenomenon of far more general applicability. Thus, since the polymer and the solvent for the polymer and the additive and the solvent for the additive take part in no chemical transformations whatsoever, it is readily apparent that the chemical natures of these materials are unimportant so long as they are chemically inert to each other.

In order to further illustrate this invention reference may be had to the following examples which serve to illustrate the invention as applied to acrylonitrile polymerization products dissolved in concentrated aqueous sodium thiocyanate solutions as solvents.

Example 1

A brightener solution was prepared by dissolving 1.0 gram of Calcofluor® White LVZ optical brightener (having the structure of Formula I, supra) and 0.5 gram of Larosol® 2–14 nonionic surface agent (having the structure of Formula XVII, supra) in 20 milliliters of glacial acetic acid. The brightener dissolved completely and no particles were evident in the brightener solution at 550× magnification. A spin dope was prepared by dissolving 100 grams of an acrylonitrilemethyl methacrylate copolymer in 900 grams of 48% aqueous sodium thiocyanate solution. 0.5 milliliter of the brightener solution were then added to 500 grams of the spin dope and this mixture was agitated for 15 minutes. Microscopic examination indicated the majority of the brightener particles to be very small (less than 0.5 micron in diameter). Some droplets of acetic acid (greater than 5 microns in diameter) containing unprecipitated brightener were present. Extrusion of this spin dope having the uniform dispersion of colloidal brightener particles as prepared above into a dilute chilled aqueous sodium thiocyanate solution in accordance with the teachings of Cresswell, U.S. Patent No. 2,558,730 issued July 3, 1951, produced a fiber product which contained the brightener uniformly dispersed as fine particles of less than 0.5 micron in diameter.

Example 2

0.5 milliliter of the brightener solution of Example 1 was added to 450 grams of a 48% aqueous sodium thiocyanate solution. The brightener precipitated immediately on mixing the two solutions forming agglomerates which produced large flocs in the solution and on the side of the beaker wherein such mixing was performed. Addition of 50 grams of the acrylonitrile-methyl methacrylate copolymer to the sodium thiocyanate solution containing precipitated and flocculated brightener did not aid in the redispersion of the brightener. The precipitated brightener blocked the holes of the spinnerette so that the thus produced spin dope could not be spun into fibers.

It is thus seen that it is essential that the solution of the additive in the solvent must be added to the viscous coagulatable polymer solution (as in Example 1) and that it is unsatisfactory to reverse the order of steps by mixing the additive solution with the solvent for the polymer before adding the polymer to produce the viscous coagulatable polymer solution (as in Example 2).

Example 3

An antioxidant solution was prepared by dissolving 1.0 gram of Antioxidant 425® antioxidant (2,2′-methylenebis-[6-tert-butyl-4-ethyl]phenol and 0.5 gram Larosel® 2–14 in 20 milliliters of glacial acetic acid. The antioxidant dissolved completely and no particles were evident in the antioxidant solution at 550× magnification. A spin dope was prepared by dissolving 100 grams of acrylonitrile-methyl methacrylate polymer in 900 grams of 48% aqueous sodium thiocyanate solution. 3.0 milliliters of the antioxidant solution were added to the spin dope and the mixture was agitated for 15 minutes. Microscopic examination under bright field illumination failed to detect any particles. The spin dope containing antioxidant was spun into a chilled aqueous sodium thiocyanate coagulating bath to produce a satisfactory fiber having antioxidant present in the fiber as determined by stability tests.

Example 4

3.0 milliliters of the antioxidant solution prepared as in Example 3 was added to 900 grams of 48% aqueous sodium thiocyanate solution. The antioxidant immediately precipitated from the solution producing large flocs of 50 microns or larger and which had a tendency to float to the surface and stick to the sides of the beaker. Addition of 100 grams of acrylonitrile-methyl methacrylate copolymer to the sodium thiocyanate solution containing antioxidant floc to form spin dope did not aid in the redispersion of the antioxidant. The precipitated antioxidant blocked the orifices of the spinnerette so that the spin dope could not be used to produce fibers.

Thus, it is again clear that the sequence of steps is critical as pointed out before in connection with the brightener additions after Example 2.

Similar tests have been performed with the same results utilizing Uvitex K® optical brightener (see Formula II, supra) dissolved in acetic acid solution along with Larosol® 2–14 surface active agent. Also similar results were obtained with the use of Brightener F–380 (see Formula I, supra wherein R is

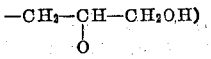

dissolved in dimethylformamide along with Triton® X–100 surface active agent (see Formula XVIII, supra). Most of the other additives previously listed have also been tested successfully for incorporation into spin dopes of acrylonitrile polymers dissolved in concentrated aqueous sodium thiocyanate solutions.

What we claim is:

1. A process for preparing a uniform dispersion of colloidal particles of a material in a viscous coagulatable polymer solution, said material being insoluble in said polymer solution, said process comprising:
   (a) dissolving said material in a solvent therefor which is miscible with said viscous coagulatable polymer solution; and
   (b) feeding and mixing the solution thus formed into said viscous coagulatable polymer solution causing said solid material to precipitate as a uniform dispersion of colloidal particles without precipitating said polymer.

2. A process for preparing a uniform dispersion of colloidal particles of a material in a coagulum comprising:
   (a) preparing a viscous coagulatable polymer solution;
   (b) dissolving said material in a solvent therefor which is miscible with said viscous coagulatable polymer solution, said material being insoluble in said polymer solution;
   (c) feeding and mixing the solution thus formed into a viscous coagulatable polymer solution; and thereafter
   (d) coagulating said polymer solution to produce a coagulum containing a uniform dispersion of colloidal particles therein.

3. A process for preparing a uniform dispersion of colloidal particles of an additive in a viscous coagulatable polymer solution, said additive being insoluble in said polymer solution, said process comprising:
   (a) dissolving said polymer in a suitable solvent to produce a viscous coagulatable polymer solution;
   (b) dissolving said additive in a solvent therefor which is miscible with said viscous coagulatable polymer solution to produce an additive solution; and
   (c) feeding and mixing said additive solution into said polymer solution causing said additive to precipitate as a uniform dispersion of colloidal particles without precipitating said polymer.

4. A process for preparing a uniform dispersion of colloidal particles of an additive in a coagulum comprising:
   (a) dissolving a polymer in a suitable solvent to produce a viscous coagulatable polymer solution;
   (b) dissolving said additive in a solvent therefor which is miscible with said viscous coagulatable polymer solution to produce an additive solution, said additive being insoluble in said polymer solution;
   (c) feeding and mixing said additive solution into said polymer solution; and thereafter
   (d) coagulating said polymer solution to produce a coagulum containing said additive as a uniform dispersion of colloidal particles therein.

5. A process for preparing fibers, containing a uniform dispersion of colloidal particles of an additive therein, from an acrylonitrile polymerization product comprising:
   (a) dissolving said acrylonitrile polymerization product in a suitable solvent to produce a spin dope;
   (b) dissolving said additive in a solvent therefor which is miscible with said spin dope to produce an additive solution, said additive being insoluble in said polymer solution;
   (c) feeding and mixing said additive solution into said spin dope causing said additive to precipitate as a uniform dispersion of colloidal particles without precipitating said acrylonitrile polymerization product; and thereafter,
   (d) extruding said spin dope through the orifices of a spinnerette into a coagulating medium to produce fibers.

6. A process as defined in claim 5 wherein the solvent for the acrylonitrile polymerization product is a concentrated aqueous solution of a water-soluble metal salt which yields highly hydrated ions in aqueous solution and wherein the solvent for the additive is a water-miscible organic solvent having up to about four carbon atoms.

7. A process as defined in claim 6 wherein the solvent for the additive includes a wetting agent.

8. A process as defined in claim 5 including a step of filtering said spin dope after admixture therewith of the additive solution and prior to extrusion and coagulation thereof.

References Cited
UNITED STATES PATENTS

| | | | |
|---|---|---|---|
| 3,203,922 | 8/1965 | Hanmer | 260—34.2 |
| 3,194,862 | 6/1965 | Coover et al. | |
| 3,085,988 | 4/1963 | Hull et al. | 260—34.2 |
| 3,061,453 | 10/1962 | Rogers | 260—34.2 |
| 2,941,970 | 6/1960 | Craig | 260—34.2 |

MURRAY TILLMAN, *Primary Examiner.*

J. SNOW, *Assistant Examiner.*

UNITED STATES PATENT OFFICE
CERTIFICATE OF CORRECTION

Patent No. 3,410,819 November 12, 1968

Raymond Erdly Kourtz et al.

It is certified that error appears in the above identified patent and that said Letters Patent are hereby corrected as shown below:

Column 4, lines 3 to 7, the portion of the formula reading $\overset{|}{\text{OH}}$ should read $\overset{|}{\text{OR}}$ Column 5, lines 44 to 50, the portion of the formula reading "$(CH_2)_3C$" should read -- $(CH_3)_3C$ --.

Signed and sealed this 10th day of March 1970.

(SEAL)
Attest:

Edward M. Fletcher, Jr.
Attesting Officer

WILLIAM E. SCHUYLER, JR.
Commissioner of Patents